(12) United States Patent
Weiser et al.

(10) Patent No.: US 7,964,698 B2
(45) Date of Patent: Jun. 21, 2011

(54) WHOLLY AROMATIC LIQUID CRYSTALLINE POLYETHERIMIDE (LC-PEI) RESINS

(75) Inventors: Erik S. Weiser, Yorktown, VA (US); Theodorus J. Dingemans, Leiden (NL); Terry L. St. Clair, Mechanicsville, VA (US); Jeffrey A. Hinkley, Yorktown, VA (US)

(73) Assignee: United States of America as represented by the Administrator of the National Aeronautics and Space Administration, Washington, DC (US)

(*) Notice: Subject to any disclaimer, the term of this patent is extended or adjusted under 35 U.S.C. 154(b) by 692 days.

(21) Appl. No.: 11/935,036

(22) Filed: Nov. 5, 2007

(65) Prior Publication Data
US 2009/0118461 A1    May 7, 2009

(51) Int. Cl.
*C08G 73/10* (2006.01)
(52) U.S. Cl. ........ 528/353; 528/176; 528/125; 528/126; 528/128; 528/172; 528/179; 528/185; 528/188; 528/310; 528/420; 528/436; 528/437
(58) Field of Classification Search ............... 528/176, 528/125, 126, 128, 172, 179, 185, 188, 310, 528/353; 525/420.436, 437
See application file for complete search history.

(56) References Cited

U.S. PATENT DOCUMENTS

| | | | |
|---|---|---|---|
| 4,803,147 A * | 2/1989 | Mueller et al. | 430/288.1 |
| 4,835,047 A | 5/1989 | Isayev et al. | |
| 4,871,817 A | 10/1989 | Rock | |
| 5,106,938 A | 4/1992 | Bookbinder et al. | |
| 5,135,990 A | 8/1992 | Bookbinder et al. | |
| 5,268,446 A | 12/1993 | Tamai et al. | |
| 5,321,096 A | 6/1994 | Okawa et al. | |
| 5,506,311 A * | 4/1996 | Tamai et al. | 525/436 |
| 5,580,918 A | 12/1996 | Morita et al. | |
| 5,708,128 A | 1/1998 | Oikawa et al. | |
| 6,958,192 B2 | 10/2005 | Hergenrother et al. | |
| 2004/0249117 A1 | 12/2004 | Acar et al. | |

FOREIGN PATENT DOCUMENTS

JP    64-56102    *    3/1989

* cited by examiner

*Primary Examiner* — James Seidleck
*Assistant Examiner* — Gregory Listvoyb
(74) *Attorney, Agent, or Firm* — Robin W. Edwards; Thomas K. McBride, Jr.

(57) ABSTRACT

The benefits of liquid crystal polymers and polyetherimides are combined in an all-aromatic thermoplastic liquid crystalline polyetherimide. Because of the unique molecular structure, all-aromatic thermotropic liquid crystal polymers exhibit outstanding processing properties, excellent barrier properties, low solubilities and low coefficients of thermal expansion in the processing direction. These characteristics are combined with the strength, thermal, and radiation stability of polyetherimides.

8 Claims, 3 Drawing Sheets

WHOLLY AROMATIC LIQUID CRYSTALLINE POLYETHERIMIDE (LC-PEI) RESINS

ORIGIN OF THE INVENTION

This invention was made in part by an employee of the United States Government and may be manufactured and used by or for the Government of the United States of America for governmental purposes without the payment of any royalties thereon or therefor.

FIELD OF THE INVENTION

The field of the present invention is thermoplastic liquid crystalline polyetherimides. Specifically, the present invention is directed to an all-aromatic thermoplastic, liquid crystalline polyetherimide.

BACKGROUND

All-aromatic polyetherimides are known to have outstanding (thermo) mechanical properties. However, at the same time, they are also known to be extremely difficult to process. They are either processed from the soluble precursor amic-acid state or via the melt using a reactive oligomer route. High-molecular-weight aromatic thermoplastic polyetherimides ("PEIs") are rare and their melt viscosities are high, making them difficult to process. A user would prefer an all-aromatic polymeric PEI with liquid crystalline properties. Ideally, the polymer would exhibit liquid crystalline properties in the melt, i.e., show thermotropic behavior. Nematic liquid crystalline polymer phases have the advantage that they show shear-thinning effects, which makes them very easy to process via a variety of melt processing techniques, and complex parts can be made with virtually no mold shrinkage. Additional advantages of liquid crystalline polymers over classic polymers include improved barrier properties towards small molecules (e.g., $H_2$, $O_2$, $H_2O$, etc.).

Several classic PEI formulations, such as Kapton® for example, meet some of the molecular requirements for forming liquid crystal phases. However, the rigid nature of the polymer backbone and/or strong inter-molecular interactions result in highly intractable polymers that never melt; in fact, they will decompose before the melting point is reached (Tm>>Tdec). Liquid crystalline phases, in solution or in the melt, are therefore not observed.

There are liquid crystalline PEIs where aliphatic flexible spacers are used in order to lower the melt transition temperature to acceptable levels. The disadvantage of using such spacers is that they result in polymers with lower mechanical and thermal properties compared to all-aromatic polymers. All-aromatic polymers are often more suitable, for instance, for aerospace and electronic applications.

SUMMARY OF THE INVENTION

Accordingly, it is an object of the present invention to combine the favorable properties of two (2) different classes of polymers--all-aromatic liquid crystalline polymers ("LCPs") and all-aromatic PEIs. With LC PEIs, it will be possible to make high modulus fibers, films, injection molded articles and other components having demanding performance requirements.

In one embodiment, a liquid crystalline polyetherimide resin composition comprises the recurring structural unit:

wherein X equals three (3) or more. This polymer is referred to herein as BPDA (3,3',4,4'-biphenyltetracarboxylic dianhydride)-P3 when X=3. The polyetherimide may have a molecular weight in the range of about 4,000 to about 50,000 g/mol, or where n (in the above structure) equals about 5 to about 70. The resin composition may be used in the formation of highly ordered polymer fibers, coatings, pastes, adhesives, foams, prepregs, highly ordered polymer films, composites, or injection-molded products with or without reinforcements. For prepregs, the resin composition is suitable for use with various fibers, including but not limited to carbon, glass and polymers, including liquid crystal polymers such as Vevlar®.

In further embodiments, a liquid crystalline polyetherimide resin composition comprises a recurring structural unit comprising one or more aromatic dianhydrides selected from one or more of the following:

where Y can be one or more of Hydrogen (H), aliphatic, halogen, (substituted)phenyl, or —$CF_3$, and one or more aromatic diamines selected from one or more of the following:

where n=1,2,3 ... and Ar can be one or more of the following aromatic units:

and where Y can be one or more of Hydrogen (H), aliphatic, halogen, (substituted)phenyl, or —$CF_3$.

BRIEF DESCRIPTION OF THE DRAWINGS

Thermotropic liquid crystals exhibit either long-range or short-range order in the melt phase. Their phase behavior is intermediate to that of a liquid and a solid. Thermotropic liquid crystals usually flow like liquids but, at the same time, they maintain some degree of order in the melt phase. A critical design rule in the synthesis of all-aromatic liquid crystalline polymers is that the polymer backbone needs to be "stiff", i.e. maintains a high degree of chain linearity. For this reason, para-substituted aromatic units are often used. The use of non-linear aromatic monomers, such as meta-substituted or ortho/substituted monomers results in destabilization of the liquid crystalline phase and may even prevent the formation of the liquid crystalline phase altogether. On the other hand, a natural consequence of using linear, para-substituted aromatic monomers is that the resulting polymers may exhibit high melting temperatures or even be intractable. In commercially available LCPs, this problem is solved by using mixtures of monomers in order to create random copolymer compositions with acceptable melting ranges.

In one embodiment of the present invention, a series of PEIs use a classic "stiff" backbone building block 3,3',4,4,'-biphenyltetracarboxylic dianhydride ("BPDA"). The BPDA is then coupled with a thermally stable, all para-substituted aryloxy-based diamine. The specific molecule includes the recurring structural unit:

wherein X equals three (3) or more.

Figure 1:
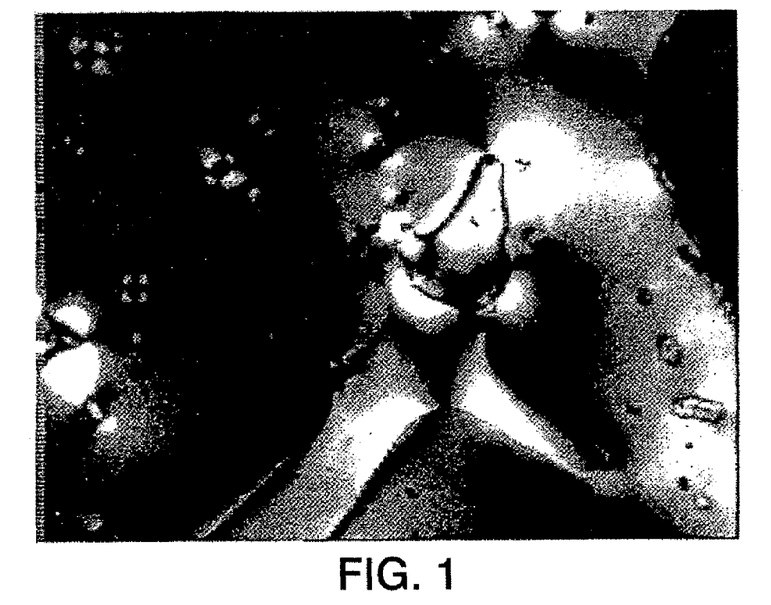
FIG. 1 is a microphotograph of a liquid crystalline, wholly aromatic, PEI polymer shown at a temperature of 375° C. (crossed polars 20X).
Figure 2:
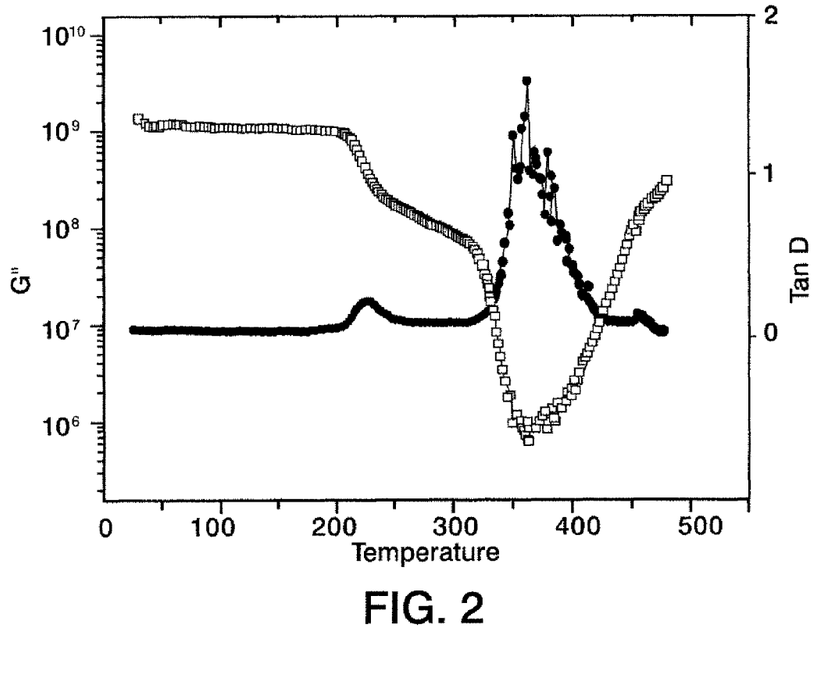
FIG. 2 is a dynamic-mechanical analysis of the PEI polymer composition comprised of the BPDA-P3 polymer having a molecular weight of about 30,000.

The aryloxy units are para-substituted in order to promote the formation of a liquid crystalline phase. This results in tractable, melt processable PEIs. Specifically, the use of meta- and ortho-based diamines disrupts the linear progression of the polymer backbone, and no liquid crystalline behavior is observed. Such detrimental effects do not occur if meta- and/or ortho-based diamines used are less than about 30% total concentration and are used in combination with one or more para-substituted diamines. In the specific case of the para-substituted aryloxy units, a typical liquid crystalline melt is observed when X equals three (3) or more. The polymer softening point, or $T_g$, is 230° C. Above this temperature the liquid crystalline phase begins to form just above 320° C. The liquid crystalline phase is stable well past 350° C. FIG. 1 is a microphotograph that visually confirms the liquid crystalline melt behavior (T=375° C.) of the polymer built on the BPDA-P3 structural unit. The polymer displays a well recognized nematic Schlieren texture. Additionally, the specific BPDA-P3 based polymer was investigated using dynamic mechanical thermal analysis (DMTA) and the thermogram is shown in FIG. 2. The thermogram confirms the thermoplastic nature of the BPDA-P3 polymer. The $T_g$ is observed at 230° C., and the onset of the solid to liquid crystalline melting $T_m$ is observed around 300° C. This DMTA scan was measured at 2.5° C./min and 1 Hz. The polymer analyzed in FIGS. 1 and 2 had a molecular weight of about 30,000 g/mol.

Figure 3:
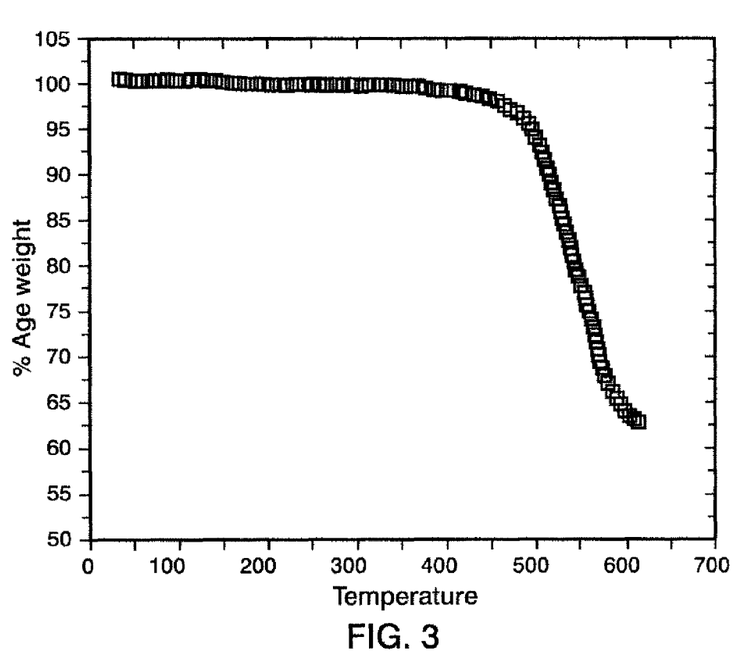
FIG. 3 is a thermogravimetric analysis (TGA) of the BPDA-P3 polymer described in FIG. 2.
Figure 4:
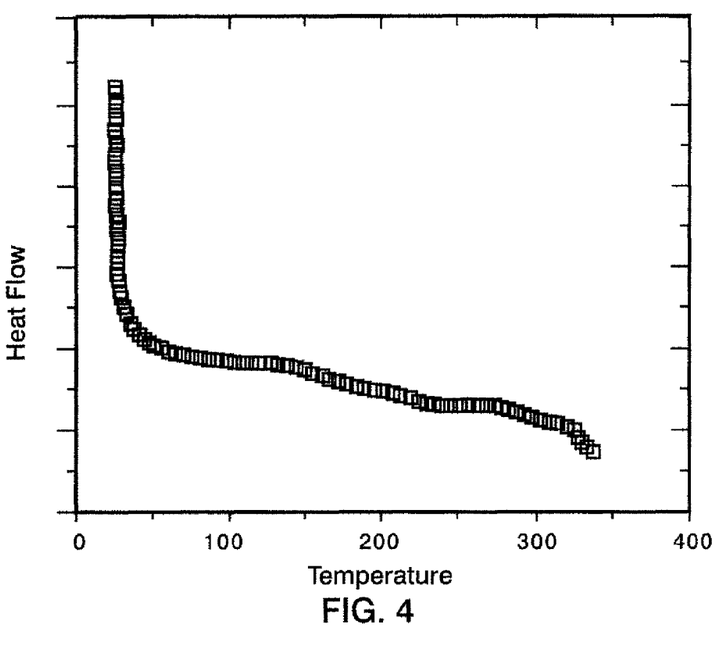
FIGS. 4 and 5 are first and second heat differential scanning calorimetry (DSC) graphs of the BPDA-P3 polymer described in FIG. 2.
Figure 5:
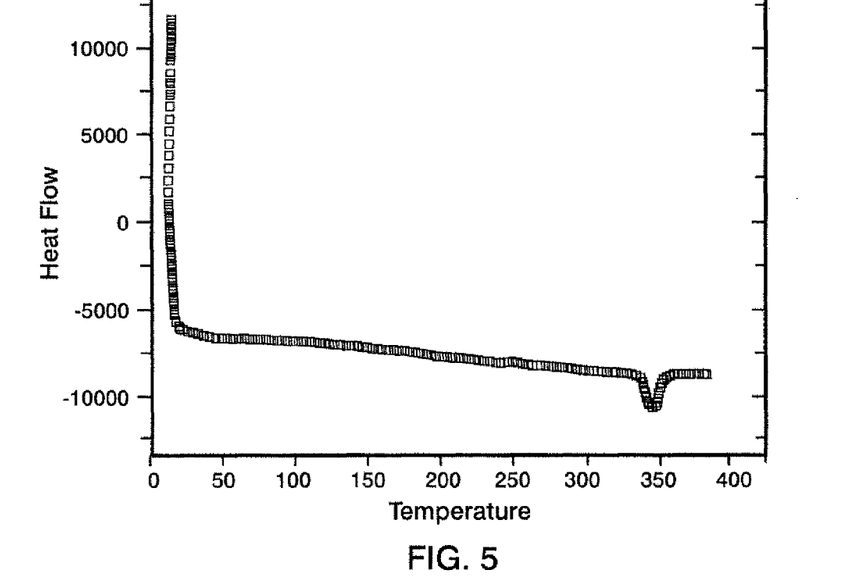

The polyamic acid precursor in N-methyl pyrrolidinone (NMP) of the BPDA-P3 polymer (MW about 30,000 g/mol) displayed an inherent viscosity of about 0.8 dL/g at 25° C. The thermogravimetric analysis (TGA) (FIG. 3) is typical of the thermal stability of an all aromatic polyimide or polyetherimide. The differential scanning calorimeter (DSC) graphs (FIGS. 4 and 5) display proof of the presence of a melting transition centering around 345° C.

While the above molecule contains a pure or substantially pure polymer, the composition could comprise this polymer in part. Additionally, a copolymer is possible that includes the recurring structural unit having the foregoing formula as a part thereof. These alternative polymers can be developed to match specific performance needs that may be required in specific applications.

While favorable properties are provided where the all para-aryloxy unit is repeated three (3) times, it is possible to include more than three (3) all para-aryloxy units in the monomer of the polymer.

Additionally, the following dianhydrides may be polymerized or copolymerized while maintaining LC properties:

where Y can be one or more of Hydrogen (H), aliphatic, halogen, (substituted)phenyl, or —$CF_3$.

Still further alternatively, the following diamines may be polymerized or copolymerized while maintaining LC properties:

where n=1,2,3 . . . and Ar can be one or more of the following aromatic units:

where Y can be one or more of Hydrogen (H), aliphatic, halogen, (substituted)phenyl, or —$CF_3$.

Other aromatic dianhydrides and aromatic 1,4- 1,3-, and 1,2-substituted diamines, available from commercial sources, may be used as co-monomers as well to tune the thermal and physical properties. Small quantities of such monomers (about 1 to about 30 mol %) may be used, without destroying the LC properties of such polymers.

The resulting liquid crystalline polyetherimide resin composition described herein may have varying molecular weights. The size of the polymer may be varied depending on the intended application. In one example, the average molecular weight of the polymer is about 5,000 g/mol. Alternatively, the molecular weight may be within the range of about 4,000 to about 50,000 g/mol. Higher molecular weight-polymers that may be formed can be more difficult to process. Low molecular weight polymers may not demonstrate the favorable physical properties that are desired.

As demonstrated above, the BPDA-P3 based polymer displays a nematic liquid crystalline melt behavior. The liquid-like nature imparts very low viscosity and enhanced processing characteristics to the polymer, especially if it is being sheared (as in an extrusion or blowing operation, for example). A material without liquid crystalline behavior would exhibit a much higher melt viscosity under similar processing conditions. Furthermore, the processing will have the effect of causing a liquid crystalline polymer to become highly ordered in the direction of the shearing. This orientation can be uniaxial in the case of extruded fibers, or biaxial in the case of extruded films or extruded parts such as plastic cups, dishes or tubular structures.

Another favorable property of a liquid crystal polymer is that when the polymer has been processed using a procedure that causes the polymer chains to become aligned (e.g., extrusion, rolling, vacuum-forming or blow-molding), the orientation is "locked in" when the polymer is cooled. The high degree of order creates a relatively high modulus (stiffness) in the polymer, which allows it to be used in thinner gauges than non-liquid crystalline polymers. In addition, the high orientation of the polymer chains in the processing direction also results in an unusually low coefficient of thermal expansion (CTE) in that direction. LCPs therefore show low shrinkage after processing, which is important for small injection moldable parts for electronic applications. Liquid crystalline polymers also exhibit extremely low gas permeability when compared to non-liquid crystalline polymers. Accordingly, these liquid crystalline polymers are excellent barrier materials, making them useful for packaging of food and electronics where permeation of oxygen and/or moisture can be detrimental, and for containing gases and/or liquids under high pressure.

In view of the foregoing, the liquid crystalline PEI described herein may be used to form directionally ordered fibers and/or films via extrusion processes, for instance, or to form articles that have high strength characteristics via, for example, injection-molding processes. This high degree of polymer alignment cannot be developed when melt viscosities are high (in the case of non liquid crystalline polymers). This is especially true in the cases where the polymeric chemical structure is fully aromatic, and in particular where the fully aromatic structure is of the very difficult to melt polyetherimide variety.

Examples of the synthesis of the BPDA-P3 polymer and other wholly aromatic, LC PEIs are set forth in the following:

EXAMPLE 1

Synthesis of the P3 diamine
(1,4-Bis[4-(4-aminophenoxy)phenoxy]benzene)

I: DMAc/K$_2$CO$_3$ and 4-fluorobenzaldehyde, reflux for 12 h.
II: m-CPBA/CHCl$_3$, r.t. for 2 h. and KOH/MeOH, reflux for 1 h.
III: DMAc/K$_2$CO$_3$ and 1-fluoro-4-nitrobenzene, reflux for 12 h.
IV: THF and 10% Pd—C/H$_2$, room temperature for 4 h.

4-Aryloxy-dialdehyde (2). A 500 ml 2-neck flask equipped with a magnetic stirrer, reflux condenser, and nitrogen inlet was charged with 11.01 g (0.1 mol) hydroquinone (1), 27.6 g (0.2 mol) finely ground K$_2$CO$_3$, 31.0 g (0.25 mol) 4-fluorobenzaldehyde, and 250 ml DMAc. This mixture was stirred and refluxed for 5 h. The dark reaction mixture was cooled to room temperature, diluted with water, and the beige product was collected, washed with water and dried. The crude product was recrystallized from isopropanol/DMAc (90/10). The 4-aryloxy-dialdehyde (2) was obtained as beige crystals. Yield: 23 g (72%). TLC (9/1 hexane/ethyl acetate) t$_r$=0.38 (one spot). Mp: 158-159° C.

1,4-Bis(4-hydroxyphenoxy)benzene (3). To a stirred solution of 12.7 g (0.04 mol) 4-aryloxy-dialdehyde (2) in 100 ml CHCl$_3$ was added 21.5 g (0.1 mol) m-CPBA. The reaction mixture was stirred for 2 h. at room temperature. The solution was washed with NaHSO$_3$ (100 ml), NaHCO$_3$ (2×100 ml), and water (100 ml). The solvent was removed by distillation and the crude product was recrystallized from methanol/water (95/5). Yield: 11.1 g (79%). The 4-aryloxy-bisformate intermediate (7 g, 0.02 mol) was dissolved in 100 ml methanol and treated with a 0.5 M KOH/methanol solution (10 ml). The reaction mixture was heated to refluxed for 1 h. The solvent was removed by distillation and the crude product was treated with a 1 M HCl solution. The crude product was collected by filtration, dried, and recrystallized from toluene/isopropanol (90/10). 1,4-bis(4-hydroxyphenoxy)benzene (3)

was obtained as off-white crystals. Yield: 5 g (85%). TLC (9/1 hexane/ethyl acetate) $t_r$=0.1 (one spot). Mp: 187-189° C.

1,4-Bis[4-(4-nitrophenoxy)phenoxy]benzene. A 250 ml 2-neck flask equipped with an overhead stirrer, nitrogen inlet, and a Dean-Stark trap with reflux condenser was charged with 6.76 g (0.023 mol) 1,4-bis(4-hydroxyphenoxy)benzene (3), 6.99 g (0.051 mol) finely ground $K_2CO_3$, 80 ml DMAc, and 80 ml toluene. This mixture was stirred and heated at 135° C. for 1.5 h., after which the temperature was increased to 175° C. The theoretical amount of water was collected in the Dean-Stark trap and removed together with the toluene. The dark reaction mixture was cooled to room temperature and 8.11 g (0.058 mol) 1-fluoro-4-nitrobenzene was added, and this mixture was heated to 160° C. overnight. After the reaction mixture was cooled to room temperature, 200 ml water was slowly added. This mixture was extracted with $CH_2Cl_2$ (3×) and the organic layer was washed with water (2×), and dried over $MgSO_4$. After removing the solvent, the crude product was recrystallized from acetone/ethanol (50/50). 1,4-Bis[4-(4-nitrophenoxy)phenoxy]benzene was obtained as off-white crystals. Yield: 9.1 g (74%). TLC (9/1 hexane/ethyl acetate) $t_r$=0.5 (one spot). Mp: 142-143° C.; $^1$H-NMR ($CDCl_3$) δ (ppm): 6.99 (d, 4H, J=9 Hz), 7.04 (s, 4H), 7.05 (s, 8H), 8.18 (d, 4H, J=9 Hz); $^{13}$C-NMR ($CDCl_3$) δ (ppm): 116.7, 119.9, 120.6, 122, 122.1, 126, 149.9, 152.9, 155.1, 163.8.

1,4-Bis[4-(4-aminophenoxy)phenoxy]benzene (P3). A 150 ml hydrogenation bottle was charged with 11.3 g (0.021 mol) 1,4-bis[4-(4-nitrophenoxy)phenoxy]benzene, 100 ml dry THF, and 0.5 g 10% Pd—C. The bottle was placed in a Parr-hydrogenator and the nitro group was reduced under $H_2$-atmosphere (50 psi) in 5 h. at room temperature. The THF solution was filtered over a short silica-gel/celite patch and the THF was removed by distillation. Pure 1,4-bis[4-(4-aminophenoxy)phenoxy]benzene (P3) was obtained after recrystallization from acetone/water (95/5) as off white crystals. Yield: 8.6 g (86%). Mp: 170° C.; IR(KBr): $v_{max}$ 3384, 3316, 1499, 1275, 1223, 1193, 1105, 1097, 865, 846, 827 $cm^{-1}$; $^1$H-NMR ($CDCl_3$) δ (ppm): 3.55 (s, 4H), 6.64 (d, 4H, J=9 Hz), 6.83 (d, 4H, J=9 Hz), 6.87-6.93 (m, 12H); $^{13}$C-NMR ($CDCl_3$) δ (ppm); 116.2. 118.6, 119.5, 119.7, 119.8, 120.5, 142.4, 149.1, 152.2, 153.1, 154.3.

EXAMPLE 2

Synthesis of high-molecular weight BPDA-P3 Liquid Crystal PEI (film, thermally imidized) (inherent viscosity of the poly(amic-acid) precursor equals 0.8 dL/g)

A 100 ml 2-neck flask equipped with overhead stirrer and nitrogen inlet was charged with 2.856 g (0.006 mol) (P3) and 10 g dry N-methyl pyrrolidinone (NMP). This suspension was stirred for 20 min. at room temperature to allow the diamine monomer to dissolve. 3,3',4,4'-biphenyltetracarboxylic dianhydride (BPDA), 1.765 g (0.006 mol) was dissolved in 16 g dry NMP and added to the diamine solution under a stream of dry nitrogen. Polymerization (about 15% solids) was allowed to proceed for 24 h. under a nitrogen atmosphere at room temperature. The obtained poly(amic-acid) had a inherent viscosity of 0.8 dL/g. The amic-acid was spread into a film, dried and thermally imidized using a hot air convection oven (1 h. at 100° C., 1 h. at 200° C. and 1 h. at 300° C.). A tough, flexible film was obtained with a Tg of 230° C. and the liquid crystal melt forms at approximately 320° C.

Figure 6:
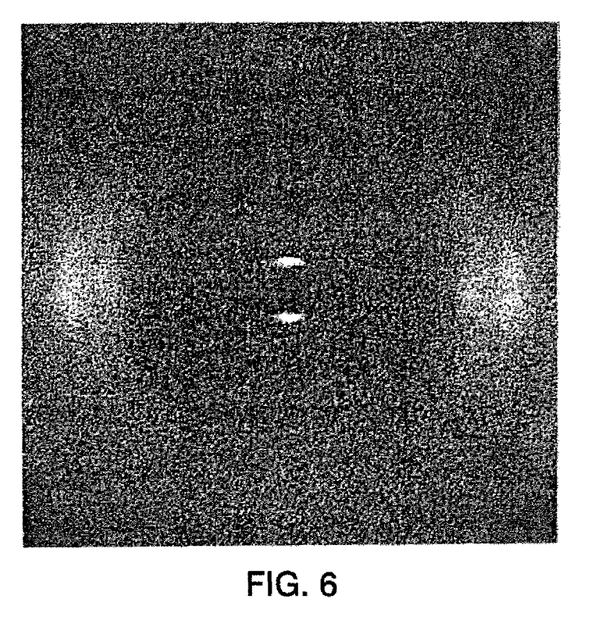
FIG. 6 is a diffraction pattern of an aligned LC PEI (BPDA-P3) film.

The as made LC PEI film (BPDA-P3) was heated into the liquid crystal phase, stretched 200% and immediately quenched to room temperature. The diffraction pattern (FIG. 6), measured at room temperature, is indicative of an aligned liquid crystal polymer.

EXAMPLE 3

Synthesis of low-molecular weight (5,000 g/mol) BPDA-P3 Liquid Crystal PEI end-capped with phthalic anhydride (powder, chemically imidized)

A 100 ml 2-neck flask equipped with overhead stirrer and nitrogen inlet was charged with 0.952 g (2 mmol) (P3) and 3 g dry dimethylacetamide (DMAc). This suspension was stirred for 20 min, at room temperature to allow the diamine monomer to dissolve. 3,3',4,4'-biphenyltetracarboxylic dianhydride (BPDA), 0.51 g (1.7 mmol), and 0.08 g (0.53 mmol) phthalic anhydride were dissolved in 3.2 g dry DMAc and added to the diamine solution under a stream of dry nitrogen. Polymerization (20% solids) was allowed to proceed for 24 h. under a nitrogen atmosphere at room temperature. The poly (amic-acid) was treated with 0.27 g pyridine and 0.34 g acetic anhydride for 4 h. The obtained polymer solution was slowly added to boiling toluene and the final imidized LC PEI was obtained as a bright yellow powder after filtration. This polymer has a Tg of 220° C. and the liquid crystal melt forms at approximately 310° C.

EXAMPLE 4

Synthesis of high-molecular weight BPDA-P3/P1 Liquid Crystal co-polymer PEI (film, thermally imidized)

A 100 ml 2-neck flask equipped with overhead stirrer and nitrogen inlet was charged with 1.428 g (0.003 mol) (P3), 0.292 g (0.001 mol) 1,4-bis(4-aminophenoxy)benzene (P1) and 8 g dry NMP. This suspension was stirred for 20 min. at room temperature to allow the diamine monomers to dissolve. 3,3',4,4'-Biphenyltetracarboxylic dianhydride (BPDA), 1.177 g (0.004 mol) was dissolved in 8.4 g dry NMP and added to the diamine solution under a stream of dry nitrogen. Polymerization (15% solids) was allowed to proceed for 24 h. under a nitrogen atmosphere at room temperature. The obtained poly(amic-acid) had a inherent viscosity of 1.1 dL/g. The amic-acid was spread, then dried and thermally imidized using a hot air convection oven (1 h. at 100° C., 1 h. at 200° C. and 1 h. at 300° C.). A tough, flexible film was obtained with a Tg of 240° C. and the liquid crystal melt forms at approximately 350° C.

EXAMPLE 5

Synthesis of BPDA-P3 Diamine Polyetherimide in DMAC (film, thermally imidized)

Into a 250 ml three-neck round bottom flask equipped with a mechanical stirrer and nitrogen gas inlet/outlet were placed equimolar of BPDA (2.9422 g, 0.01 mole) and P3 Diamine (4.7655 g, 0.01 mole). DMAC 56.52 g was then added to the flask to make a mixture solution of 12% (w/w) solids. The solution was stirred overnight at room temperature; the resulting poly(amic-acid) solution had an inherent viscosity ($\eta_{inh}$) of 1.61 dl/g (0.5% in DMAC at 25° C.), a cured Tg of 215° C. and a Tm of 347° C. A 2% offset version of the polymer was prepared in the same manner with an excess 2% molar of diamine which was encapped with 4 mol % of phthalic Anhydride (PA); the resulting polymer had an inherent viscosity of 0.93 dL/g. The amic-acid was spread, then dried and thermally imidized using a hot air convection oven (1 h. at 100° C., 1 h. at 200° C. and 1 h. at 300° C.). A tough, flexible film was obtained with a Tg of 201° C. by DSC and the liquid crystal melt forms at approximately 345° C.

EXAMPLE 6

Synthesis of BPDA-P3 Diamine Polyetherimide in NMP (film, thermally imidized)

The same procedure in Example 5 was followed; equimolar of BPDA (2.9422 g, 0.01 mole) and P3 diamine (4.7655 g, 0.01 mole) were placed into a 250 ml three neck round bottom flask equipped with a mechanical stirrer and nitrogen gas inlet/outlet. NMP 52.66 g was then added to the flask to make a mixture solution of 12.77% (w/w) solids. The solution was stirred overnight at room temperature; the resulting Polyetheramide acid solution had an inherent viscosity ($\eta_{inh}$) of 1.49 dL/g (0.5% in NMP at 25° C.). A film cast on a glass plate was cured for one hour each at 100° C., 200° C., and 300° C. The resulting yellow-colored film had a Tg of 214° C. and a Tm of 345° C. measured by DSC.

EXAMPLE 7

Synthesis of BPDA/PMDA (mole ratio 90/10)-P3 Diamine in DMAC (film, thermally imidized)

BPDA (2.6480 g, 0.009 mole), pyromellitic dianhydride (PMDA) (0.2181 g, 0.001 mole) and P3 diamine (4.7655 g, 0.01 mole) were placed in a 250 ml three neck round bottom flask. DMAC 60.3 g was added to make a solution mixture of 11.23% (w/w) solids. The reaction mixture was stirred overnight under nitrogen at room temperature. The resulting poly (amic-acid) had an inherent viscosity of 1.18 dL/g (0.5% in DMAC at 25° C.). The polyfamic-acid) was spread, then dried and thermally imidized using a hot air convection oven (1 h. at 100° C., 1 h. at 200° C. and 1 h. at 300° C.). A tough, flexible film was obtained with a Tg of 211° C. measured by DSC and the liquid crystal melt forms at approximately 342° C.

EXAMPLE 8

Synthesis of BPDA/PMDA (mole ratio 80/20)-P3 Diamine in DMAC (film, thermally imidized)

BPDA (2.3538 g, 0.008 mole), pyromellitic dianhydride (PMDA) (0.4362 g, 0.002 mole) and P3 diamine (4.7655 g, 0.01 mole) were placed in a 250 ml three neck round bottom flask. DMAC 60.3 g was added to make a solution mixture of 11.23% (w/w) solids. The reaction mixture was stirred overnight under nitrogen at room temperature. The resulting poly (amic-acid) had an inherent viscosity of 1.31 dL/g (0.5% in DMAC at 25° C.). The pol(amic-acid) was spread, then dried and thermally imidized using a hot air convection oven (1 h. at 100° C., 1 h. at 200° C., at 1 h. at 300° C. and 6 h. at 340° C.). A tough, flexible film was obtained which forms a liquid crystal melt at approximately 377° C. as measured by DSC.

EXAMPLE 9

Synthesis of BPDA/PMDA (mole ratio 70/30)-P3 Diamine in DMAC (film, thermally imidized):

BPDA (2.0596 g, 0.007 mole), pyromellitic dianhydride (PMDA) (0.6547 g, 0.003 mole) and P3 Diamine (4.7655 g, 0.01 mole) were placed in a 250 ml three neck round bottom flask. DMAC 60.3 g was added to make a solution mixture of 11.23% (w/w) solids. The reaction mixture was stirred overnight under nitrogen at room temperature. The resulting poly (amic-acid) had an inherent viscosity of 1.22 dL/g (0.5% in DMAC at 25° C.). The poly(amic-acid) was spread, then dried and thermally imidized using a hot air convection, oven (1 h. at 100° C., 1 h. at 200° C., at 1 h. at 300° C. and 6 h. at 340° C.). A tough, flexible film was obtained which forms a liquid crystal melt at approximately 381° C. as measured by DSC.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed as new and desired to be secured by Letters Patent of the United States is:

1. A liquid crystalline polyetherimide comprising the recurring structural unit:

wherein X equals at least three.

2. The liquid crystalline polyetherimide as in claim 1, wherein X equals three.

3. The liquid crystalline polyetherimide as in claim 1, comprising a first diamine 1,4-bis(4-aminophenoxy)benzene and a second diamine 1,4-bis[4-(4-aminophenoxy) phenoxy] benzene, wherein the ratios of the first diamine and the second diamine are about 25% and about 75%, respectively.

4. The liquid crystalline polyetherimide as in claim 1, wherein the liquid crystalline polyetherimide has a molecular weight in the range of about 4,000 g/mol to about 50,000 g/mol.

5. A product prepared from the liquid crystalline polyetherimide of claim 1, wherein the product is in the form selected from the group consisting of film, fiber, composite, foam, prepreg, molding, coating, adhesive and paste.

6. A prepreg as in claim 5, wherein the prepreg fiber comprises a material selected from the group consisting of carbon, glass and liquid crystal polymer.

7. A polymer film formed by extruding the liquid crystalline polyetherimide as in claim 1.

8. An article formed by injection-molding the liquid crystalline polyetherimide resin composition as in claim 1.

* * * * *